March 1, 1966 R. SHAW, JR 3,237,456
INTEGRATING ACCELEROMETER
Filed June 20, 1963 5 Sheets-Sheet 1

INVENTOR.
RICHARD SHAW JR.
BY Hubert L. Davis
ATTORNEY

March 1, 1966  R. SHAW, JR  3,237,456
INTEGRATING ACCELEROMETER
Filed June 20, 1963  5 Sheets-Sheet 2

INVENTOR.
RICHARD SHAW JR.
BY
ATTORNEY

INVENTOR.
RICHARD SHAW JR.
BY
ATTORNEY

United States Patent Office 3,237,456
Patented Mar. 1, 1966

3,237,456
INTEGRATING ACCELEROMETER
Richard Shaw, Jr., Mahwah, N.J., assignor to Bendix Corporation, Teterboro, N.J., a corporation of Delaware
Filed June 20, 1963, Ser. No. 289,297
6 Claims. (Cl. 73—503)

This invention relates to an integrating accelerometer and more particularly to a novel electronic means for producing a variable frequency, constant-magnitude, rotating magnetic field acting upon a drag cup so as to provide a restoring torque for an acceleration responsive pendulum, the displacement of the pendulum being responsive to sensed accelerational forces acting upon the pendulum to actuate a capacitive pick-off to control the electronic means.

Heretofore, prior known accelerometers have effectively operated to measure accelerational forces acting on a known mass such as a pendulum together with a pickoff which senses the displacement of the pendulum relative to a frame to control a torque generating device for applying a torque to the pendulum so as to tend to return the same to a null position. In such arrangement, as the frame is accelerated, the pendulum tends to lag behind it whereupon the resulting displacement of the pendulum is sensed by a pickoff to produce an electrical signal which may be amplified and fed to the torque generating device. The torque generating device is then effective to move the pendulum back towards its neutral position relative to the frame. In such prior accelerometers of the aforenoted type, the generated torque is proportional to the current flowing through the torque generating device so that the acceleration signal can then be obtained from an ammeter in series with the torque generator. In the present invention the displacement of the pendulum may be small and the applied torque proportional to the accelerational forces and the displaced pendulum is restored by a balancing torque proportional to the frequency developed by a novel electronic means, hereafter described, so that a suitable counter mechanism electrically connected in series with the torque balancing means may be used to indicate velocity in response to the accelerational condition.

An object of the invention is to provide an improvement in such prior pendulous operative accelerometers, particularly in the provision of an electronic means for producing a variable frequency, constant-magnitude, rotating magnetic field acting upon a drag cup so as to provide a restoring torque for an accelerational responsive pendulum, the displacement of which pendulum in response to the sensed accelerational forces acts on a capacitive pickoff to control the electronic means.

Another object of the invention is to provide an integrating accelerometer of simple construction having a minimum number of movable parts.

Another object of the invention is to provide an integrating accelerometer including means for generating a digital velocity signal for effecting a controlling action without requiring analog-to-digital conversion equipment.

Another object of the invention is to provide an acceleration responsive pendulum together with a capacitive pickoff to sense displacement of the pendulum in response to accelerational forces in which the motion of a single capacitive moving plate relative to two fixed capacitor plates results in an increase in the capacitance of one condenser and a decrease in the capacitance of the other condenser, the two condensers being connected respectively into suitable tank circuits of two oscillators so that the frequency of one of the oscillators increases while that of the other oscillator decreases, and in which arrangement the output of one oscillator is connected directly to the inputs of two phase sensitive demodulators while the output of the other oscillator is connected to the inputs of two phase shifting networks, one of which networks provides a 45 degree lead signal at the output thereof and the other of which networks provides a 45 degree lag signal at the output thereof. The outputs of the networks being in turn applied, respectively, as the carrier reference frequency of the two phase sensitive demodulators with the respective two phase sensitive demodulators supplying power to two control coils of a two phase motor acting upon a drag cup rotor, the drag cup rotor being operatively connected to the acceleration responsive pendulum so as to provide a torque acting in a sense to restore the pendulum to a null position following displacement thereof by the accelerational forces and there being further provided a two-way counter of conventional type to indicate velocity by counting the cycles of the variable frequency alternating current applied to one of the field windings of the two-phase drag cup motor, the counter being arranged to increase the count when the phase of the alternating current applied across this winding leads that across the other winding and decrease the count when it lags the phase of the alternating current applied across the other winding.

Another object of the invention is to provide the aforenoted novel combination of oscillators and phase sensitive demodulators to effectively generate a variable frequency rotating field for effecting a restoring torque on a pendulum type accelerometer.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

Figure 6:
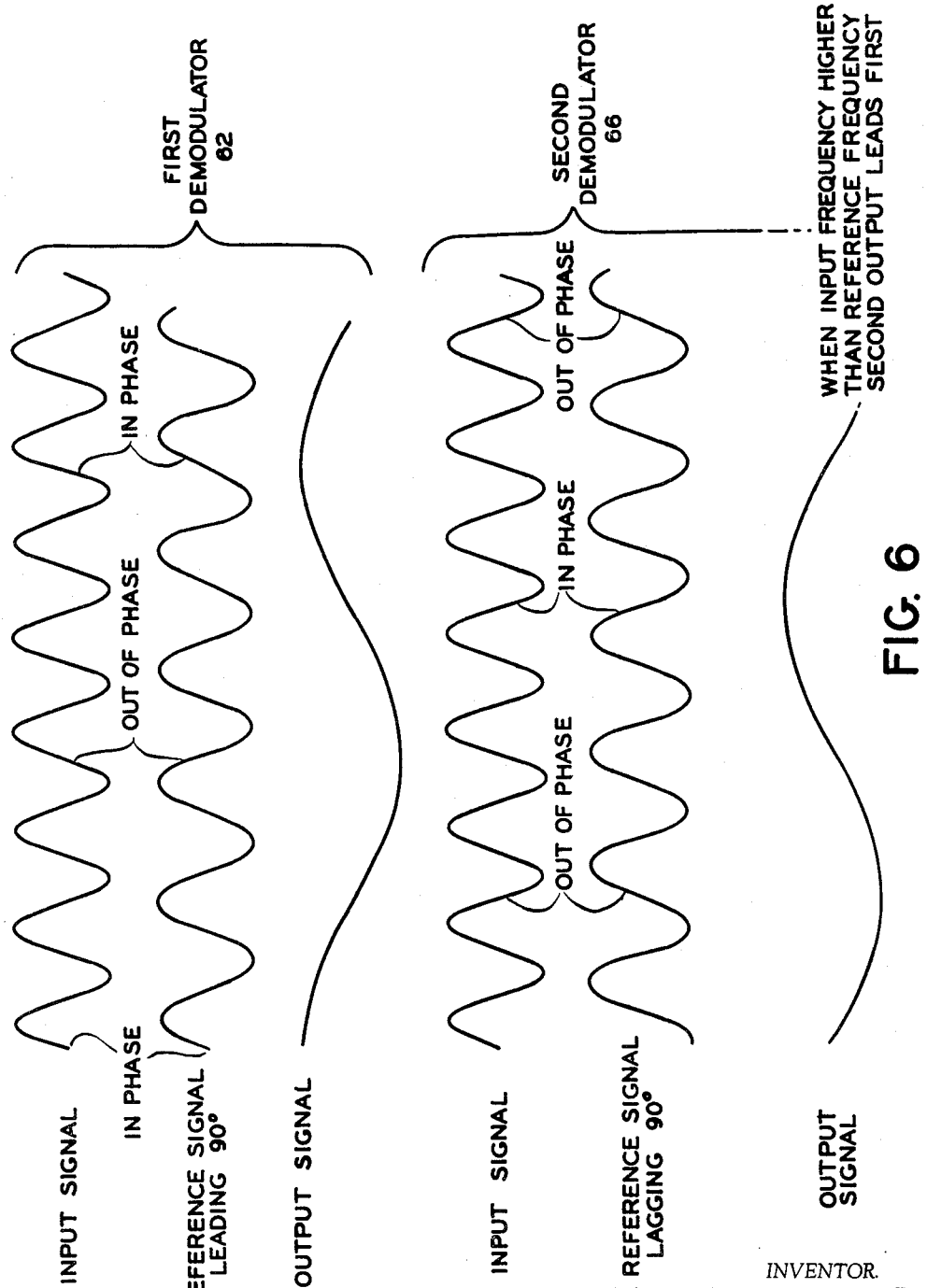

FIGURE 6 is a graphical illustration showing the relationship of the electrical phases of the input, reference and output signals of the phase sensitive demodulator 62 in relationship to the input, reference and output signals of the phase sensitive demodulator 66 upon the input signal to the demodulators having a frequency greater than the frequency of the reference signals and showing the output signal from the second demodulator 66 leading the output signal from the first demodulator 62.

Figure 7:
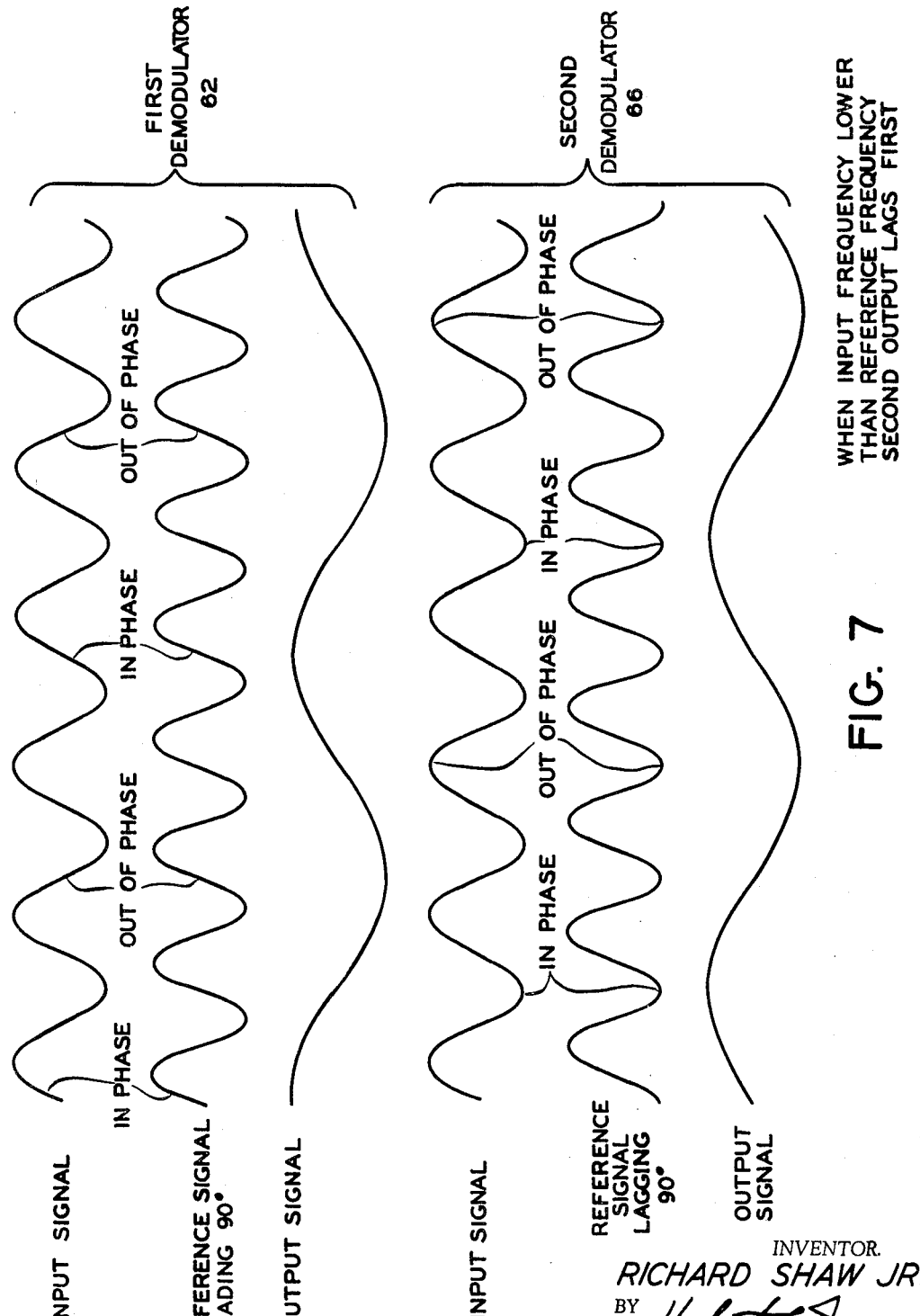

FIGURE 7 is a graphical illustration showing the relationship of the electrical phases of the input, reference and output signals of the phase sensitive demodulator 62 in relationship to the input, reference and output signals of the phase sensitive demodulator 66 upon the input signal to the demodulators having a frequency less than the frequency of the reference signals and showing the output signal from the second demodulator 66 lagging the output signal from the first demodulator 62.

Figure 1:
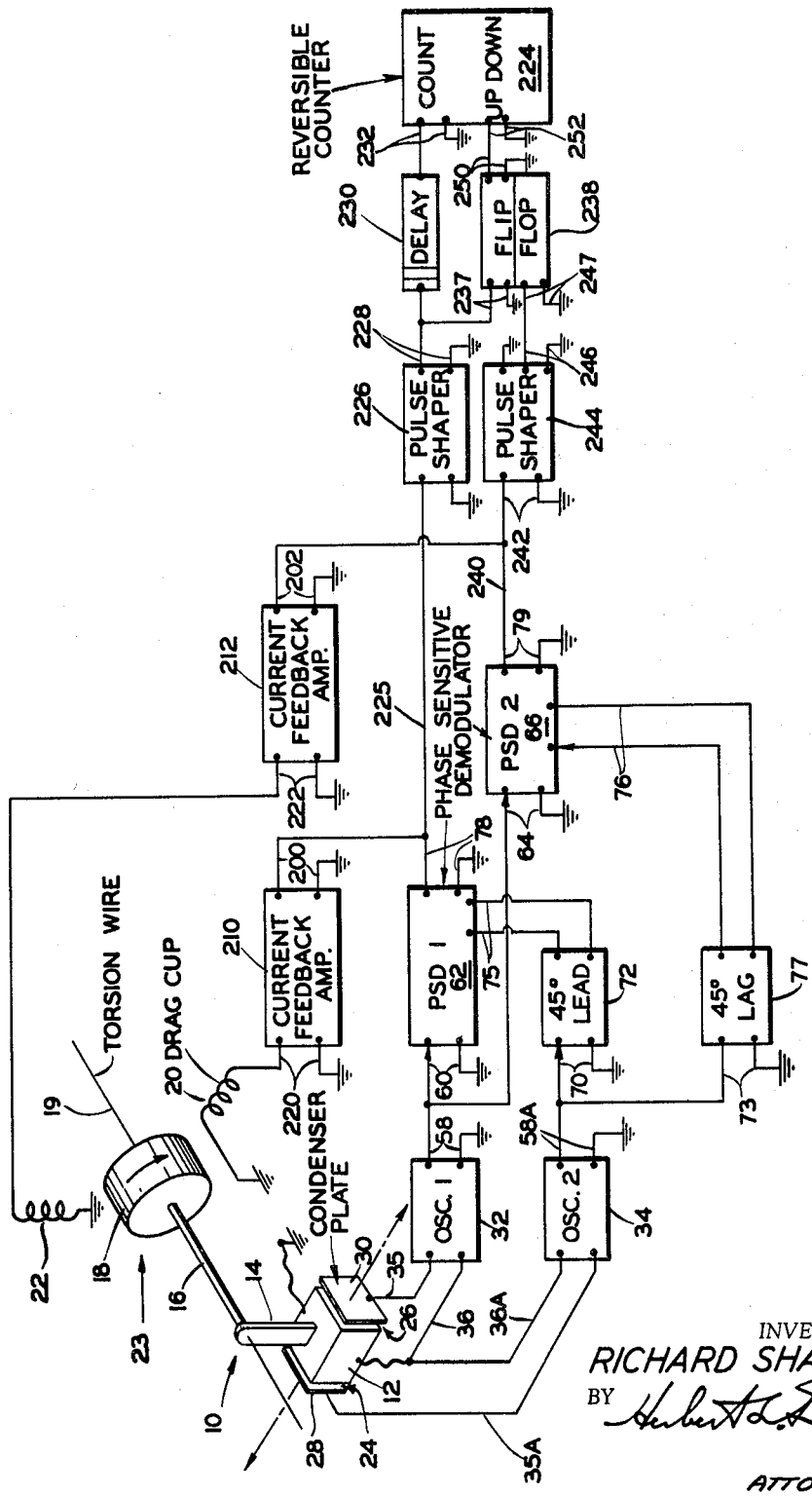
FIGURE 1 is a schematic diagram of a system embodying the invention.

Referring to the drawing of FIGURE 1, there is indicated by the numeral 10 an acceleration responsive pendulum including a pendulum mass 12 affixed to an arm 14 secured at its upper end to a pivotally mounted shaft 16 which connects the pendulum 10 to a drag cup 18 of conventional type including a torsion wire 19 which provides a frictionless pivot for the shaft that carries the pendulum 10 and drag cup 18. The two coils 20 and 22 are arranged around the drag cup rotor 18 in conventional manner as the stator windings of a two-phase motor 23.

The mass 12 of the pendulum 10 provides a movable plate of capacitors 24 and 26 having fixed plates 28 and 30, respectively, cooperatively arranged in relation thereto.

Figure 2:
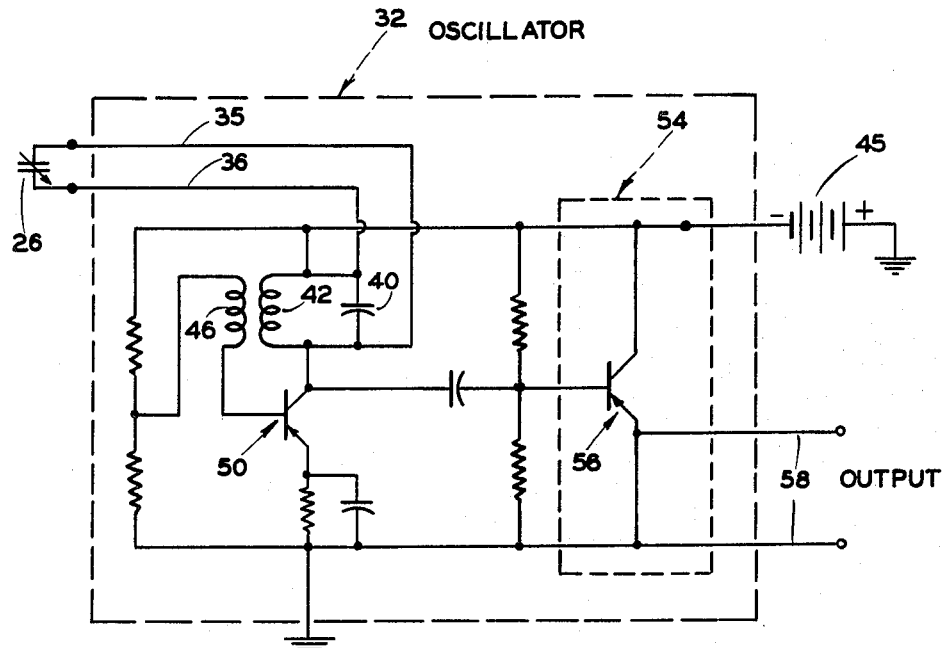
FIGURE 2 is a schematic wiring diagram illustrating an oscillator for use in the system of FIGURE 1.

The variable capacitors 24 and 26 are in turn operatively connected in tank circuits of variable oscillators 32 and 34 which may be of a type such as disclosed in FIGURE 2. Thus, the variable capacitor 26 has its condenser plate 30 connected by a conductor 35 to one input terminal of the oscillator 32, while the variable plate 12 of the capacitor 26 is connected by an electrical conductor 36 to another input terminal of the oscillator 32. Similarly, the variable plate 12 of the capacitor 24 is connected by electrical conductor 36A to one input terminal of the oscillator 34 and the fixed plate 28 of the capacitor 24 is connected by an electrical conductor 35A to another input terminal of the oscillator 34.

*Oscillator circuit*

The operation of the variable oscillator circuits 32 and 34 are identical, and therefore, a description of the one oscillator circuit 32 will suffice for an understanding of the oscillator circut 34.

The oscillator circuit may be of any suitable type well known in the art and as shown in FIGURE 2, includes a fixed capacitor 40 connected across the conductors 35 and 36 leading from an inductive winding 42 to the variable capacitor 26 formed by the plates 12 and 30 of the pendulum 10. The inductance 42, fixed capacitor 40 and variable capacitor 26 form a tank circuit in the oscillator 32. Any disturbances such as transitory noise or a starting transient will build up a small oscillatory current in the tank circut as energy supplied by a battery 45 may be transferred back and forth between the inductance 42 and the capacitors 26 and 40. A winding 46 is inductively coupled to the winding 42 so that the oscillating current in the winding 42 generates a voltage in the winding 46 which is amplified by a transistor 50 and in turn applied again to the winding 42. This causes the oscillation in the tank circuit to increase until it is limited by dissipation and nonlinearities. The frequency of oscillation is very nearly the natural frequency of the tank circuit, and therefore, the frequency of oscillation of the tank circuit may be varied by changing the variable capacitor 26.

An emitter follower stage 54 including transistor 56 is so arranged as to prevent a load applied across output lines 58 from effecting the oscillations. These output lines 58 from the oscillator 32 are in turn connected to the input terminals 60 of a phase sensitive demodulator 62, shown in FIGURE 3, and to the input terminals 64 of a second phase sensitive demodulator 66, as shown in FIGURE 1.

Figure 4:
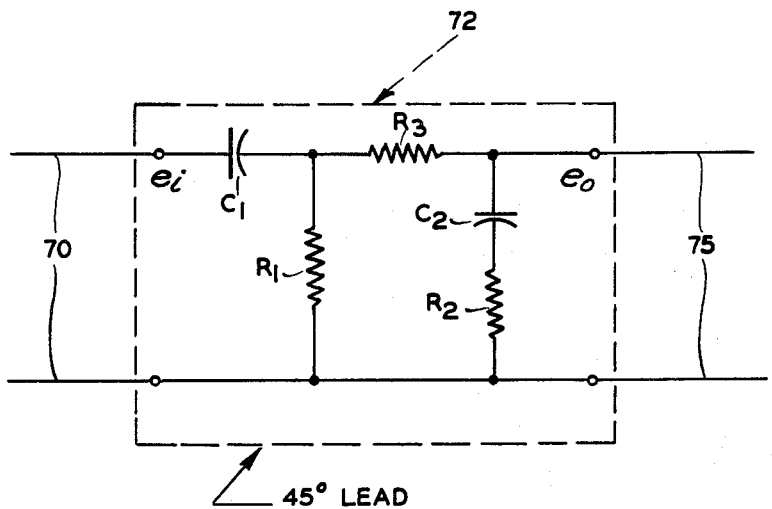
FIGURE 4 is a wiring diagram of a 45 degree phase shifting lead network for use in the system of FIGURE 1.
Figure 5:
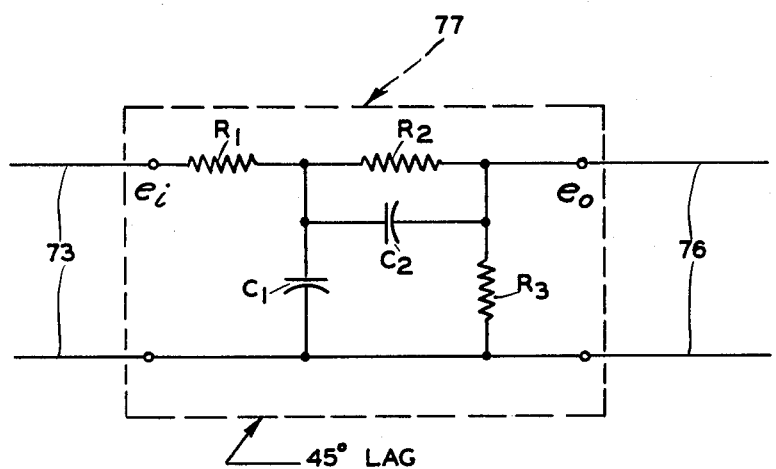
FIGURE 5 is a wiring diagram of a 45 degree phase shifting lag network for use in the system of FIGURE 1.

The second oscillator 34 may be of identical structure to that of the oscillator 32 and has output lines 58A connected to the input terminals 70 of a forty-five degree lead network 72 having output lines 75, as shown in FIGURE 4, and to the input terminals 73 of a forty-five degree lag network 77 having output lines 76, as shown in FIGURE 5.

*Phase sensitive demodulator*

The phase sensitive demodulator 62 and the phase sensitive demodulator 66 may be of identical structure and therefore, a description of the one demodulator circuit 62 will suffice for an understanding of the demodulator circuit 66. The structure of the phase sensitive demodulator 62 is shown in FIGURE 3 in which an output signal from the oscillator 32 is applied across the input lines 60 of the phase sensitive demodulator 62.

The phase sensitive demodulator is a combination of electrical components which normally receives a modulated alternating current signal and an alternating current reference signal. Its function is to provide an output signal, the magnitude of which is proportional to the magnitude of the input signal while the polarity of the output signal depends on the phase of the input signal relative to the reference signal.

Figure 3:
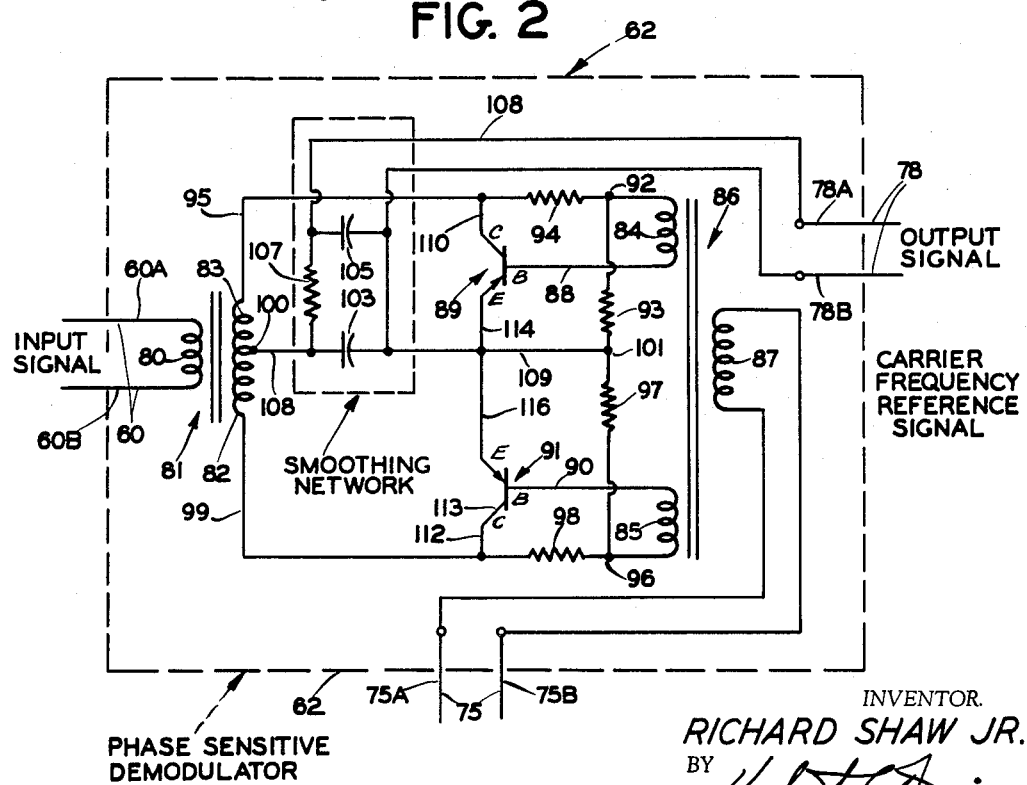
FIGURE 3 is a wiring diagram of a phase sensitive demodulator for use in the system of FIGURE 1.

FIGURE 3 shows one circuit that accomplishes this result. Although the circuit may be well known, the present application thereof is novel. A review of its basic operating principles may, therefore, be in order.

In the phase sensitive demodulator, shown in FIGURE 3, the input lines 60 are connected to a primary winding 80 of a transformer 81 having secondary windings 82 and 83 forming the first and second arms of a bridge circuit including as third and fourth arms thereof secondary windings 84 and 85 of a transformer 86. The primary winding 87 of the transformer 86 is connected across the reference lines 75.

The secondary winding 84 is connected by a conductor 88 to a base of a transistor 89 while the secondary winding 85 is connected through a conductor 90 to a base of a transistor 91. The other end of the secondary winding 84 is connected to a point 92 between resistor elements 93 and 94 which are connected through a conductor 95 to one end of the secondary winding 83 of the transformer 81. The other end of the secondary winding 85 is connected to a point 96 between resistor elements 97 and 98 which are in turn connected through a conductor 99 to the opposite end of the secondary winding 82 of the transformer 81.

The windings 82 and 83 are connected at a center point 100 while the resistors 93 and 97 are connected at a center point 101. The center points 100 and 101 are coupled by capacitors 103 and 105, and resistor 107 forming a smoothing network for output signals applied through conductors 108 and 109 leading from the points 100 and 101, respectively, to the output leads 78.

The transistor 89 has a collector element connected by a conductor 110 to the line 95 while the transistor 91 has a collector element connected by a conductor 112 to the conductor 99. The emitter elements of the transistors 89 and 91 are connected respectively by conductors 114 and 116 to the conductor 109 leading from the center point 101.

The arrangement then of the phase sensitive demodulator of FIGURE 3 is such that the conductivity of the transistor 89 is controlled by the polarity of the charge applied to the collector element through the conductor 110 by the secondary windings of the transformers 81 and 86 while the conductivity of the transistor 91 is controlled by the charge applied through the conductor 112 by the transformers 81 and 86.

In the operation of the phase sensitive demodulator, it may be seen that the input signal applied to the transformer 81 by the conductors 60 may or may not be in phase with the reference signal applied to the primary winding 87 across the transformer 86 through conductors 75.

Assume first that the input signal is in phase with the reference signal, so that input conductor 60A is positively charged at the same time as reference conductor 75A. The polarity of transformer 81 is such that conductor 95 will be positive and 99 negative when 60A is positive. The polarities of the windings of transformer 86 are so arranged that transistor 89 is conducting and 91 nonconducting when conductor 75A is positive. Therefore, output conductor 78B will be positive.

Now consider the situation half a cycle later, input conductor 60A and reference conductor 75A are both negative. Therefore, conductor 99 is positive and transistor 91 is conducting. The negative potential of conductor 85 is blocked by transistor 89, which is now nonconducting. Output conductor 78B is, therefore, still positive.

By similar reasoning, it is apparent that when conductors 60A and 75A have opposite polarity, 78B is negative.

In the present application, both the input and the reference terminals receive signals of essentially constant amplitude but varying frequency. Obviously, the phase of the input relative to the reference is varying continuously. It has been shown that the polarity of output terminal 78B is positive when the input is in phase with the reference signal and negative when input and reference are out of phase. When the input leads or lags the reference by 90 degrees, the potential of conductor 95 will average zero while transistor 89 is conducting and the potential of conductor 99 will likewise average zero while transistor 91 is conducting. Thus the potential of 78B relative to 78A alternates at a frequency equal to the difference between the input and reference frequencies. Ripple in the output signal is effectively eliminated by the smoothing network shown in the diagram including capacitors 103 and 105 and resistor 107. This application of the phase sensitive demodulators 62 and 66 may be clarified by reference to the wave forms shown in FIGURES 6 and 7.

As heretofore explained, the phase sensitive demodulator 66 has a corresponding structure to that of the phase sensitive demodulator 62 in which the input lines 64 of the demodulator 66 correspond to the input lines 60 of the demodulator 62; the reference signal lines 76 of the demodulator 66 correspond to the reference signal lines 75 of the demodulator 62; and the output lines 79 of the demodulator 66 correspond to the output lines 78 of the demodulator 62.

Phase shifting network

The carrier reference signal applied across the reference lines 75 of the demodulator 62 and the reference signal applied across the reference lines 76 of the demodulator 66 are in turn provided by the 45 degree lead network 72 and the 45 degree lag network 77, respectively.

The two phase shifting networks illustrated in FIGURES 4 and 5 are arranged to provide a 45 degree lead and a 45 degree lag, respectively. In both cases the networks 72 and 77 are so arranged that the phase shift is insensitive to frequency over a considerable or normal operating range. The several components of the 45 degree network of FIGURE 4 may have the following indicated values in which $\omega$ is the average frequency generated by the oscillators 32 and 34 expressed in radians per second;

$$R_1C_1=\frac{1}{20\omega} \qquad R_3=5R_2$$

$$R_2C_2=\frac{1}{\sqrt{6}\omega} \qquad R_3 \gg R_1$$

while the several components of the 45 degree leg network of FIGURE 5 may have the following indicated values in which $\omega$ is the average frequency:

$$R_1C_1=\frac{20}{\omega} \qquad R_3=\frac{R_2}{5}$$

$$R_2C_2=\frac{\sqrt{6}}{\omega} \qquad R_2=\gg R_1$$

The respective lead and lag networks of FIGURES 4 and 5 follow conventional circuit designs, and therefore, a detail explanation thereof is not deemed necessary.

Drag cup control

The output lines 78 of demodulator 62 and the output lines 79 of demodulator 66 are connected to the input lines 200 and 202, respectively, of suitable current feedback amplifiers 210 and 212, the outputs of which are connected, respectively, through output lines 220 and 222 to the controlling windings 20 and 22, respectively, of the motor 23, which windings are arranged as the stator windings of a two phase motor around the drag cup 18. The drag cup 18 is drivingly connected through a shaft 16 to the pendulum arm 14 so as to provide a torque acting in a sense to restore the adjustable plate 12 of the pendulum to a null position relative to the fixed plates 28 and 30 of the variable capacitors 24 and 26.

A standard two-way counter indicated by the numeral 224 operates to indicate velocity in response to the accelerational forces acting upon the pendulum 12 by counting the cycles of the variable frequency alternating current energizing the control coil 20.

The foregoing is accomplished by connecting the output lines 78 from the demodulator 62 through line 225 to the input of a pulse shaper 226 of conventional type. The output of the pulse shaper 226 is in turn connected through output lines 228 and a suitable delay mechanism 230 of conventional type to the input connections 232 of the two-way counter 224. The output lines 228 of the pulse shaper 226 are also connected to input lines 237 of a flip-flop circuit 238 of conventional type.

Further, the output lines 79 of the phase sensitive demodulator 66 are similarly connected through a conductor 240 to input lines 242 of a pulse shaper 244 of conventional type having its output lines 246 connected to second input lines 247 of the flip-flop circuit 238. The flip-flop circuit 238 has output lines 250 connected to input lines 252 of the reversible counter 224.

Thus, the counter 224 receives two inputs, one through the input connections 232 which carries the train of pulses to be counted and the other input through the input connections 252 which applies to the counter mechanism 224 add or subtract signals. The delay mechanism 230 allows time for the add or subtract switching operation, which delay must be short relative to the shortest expected intervals between the pulses.

This arrangement is such that the count or indicated velocity provided by the reversible counter 224 as controlled by the flip-flop circuit 238 increases when the voltage across the winding 20 leads that across the winding 22 and decreases when the voltage applied across the control winding 20 lags that across the control winding 22.

Operation

From the foregoing, it will be seen that displacement of the pendulum 12 in response to accelerational forces acting in directions indicated by the arrows will be sensed by a capacitive pickoff including the capacitors 24 and 26. The motion of the single adjustable plate 12 relative to the two plates 28 and 30 will result in an increase in the capacitance of the one condenser and a decrease in the other depending, of course, upon the sense of the displacement.

The two condensers 24 and 26, as heretofore explained, are connected into tank circuits of the two variable oscillators 32 and 34, the circuits of which are shown in detail in FIGURE 2; consequently, the frequency of the one oscillator will decrease while that of the other oscillator will increase depending upon the sense of displacement of the pendulum 12 acting in response to the accelerational forces applied thereto.

The output of the one oscillator 32 is connected directly to the input terminals of the phase sensitive demodulators 62 and 66. The output of the other oscillator 34 is connected to suitable phase shifting networks; one of which networks 72 provides a 45 degree phase lead while the other network 77 provides a 45 degree phase lag in the alternating current applied to the respective output lines 75 and 76 relative to the alternating current applied to the input lines 70 and 73. The outputs of the networks 72 and 77 are in turn applied to the reference terminals 75 and 76 of the demodulators 62 and 66.

The demodulators 62 and 66 in turn supply variable frequency alternating current to the two control coils 20 and 22 arranged as stator windings around the drag cup 18. The drag cup 18 is operatively connected to the pendulum 12 so as to provide the necessary restoring torque to return the same to a neutral position relative to the fixed capacitance plates 28 and 30. A standard two-way counter mechanism 224 indicates the effective velocity by counting the cycles of the variable frequency alternating current energizing the control winding 20 and applied through the conductor 225.

A feature of the invention is the effect of the phase-shifting networks 72 and 77 on the action of the phase sensitive demodulators 62 and 66. It has been shown previously that the output signal from one demodulator is an alternating voltage having a frequency equal to the difference between the input and reference frequencies. Up to this point, it has been immaterial whether the input or the reference frequency is higher. For the ensuing discussion, assume the input frequency to be higher. A second demodulator, receiving the same input signal and a reference signal that lags the first reference by 90 degrees, will produce an output signal leading the first output by 90 degrees. This fact can be appreciated by referring to the set of waves in FIGURE 6, and noting the times when the input and reference signals are in phase.

Now consider the case in which the input frequency is lower than the reference frequency. This is illustrated in FIGURE 7. It will be noted that, in this case, the output signal of the second demodulator 66 lags the output signal of the first demodulator 62.

Rather than introduce a 90 degree phase lag into one reference signal, it is desirable to introduce only a 45 degree lag into one, and a 45 degree lead into the other. Among other advantages, this arrangement provides both demodulators with reference signals at the same voltage level.

In summary, the combination of phase shifting networks and demodulators achieves the following result:

It receives two high frequency signals, designated input and reference, and delivers two low frequency output signals. The frequency of both output signals is equal to the difference between the input and reference frequencies. When the input frequency exceeds the reference frequency, the first output leads the second. When the input frequency is lower than the reference, the first output lags the second.

Further, the direction of the torque applied by the coils 20 and 22 to the drag cup 18 will be dependent upon whether the phase of the alternating current applied to the winding 20 leads or lags the phase of the alternating current applied to the winding 22.

Since the restoring torque applied by the two-phase drag cup motor 23 is proportional to the angular velocity of the magnetic field generated by coils 20 and 22 about the drag cup 18, this angular velocity must be proportional to acceleration. The total angle through which the magnetic field rotates is, therefore, proportional to velocity which is measured by counting the cycles of the alternating current energizing the control winding 20.

The capacitive pickoff provided by the condensers 24 and 26 assert a very small torque on the pendulum acting as a negative spring. The pickoff and the torsion wire 19 are so designed as to make the sum of the torques zero. From the aforenoted arrangement, it will be seen that there has been provided a novel electronic means introducing a variable frequency, constant magnitude, rotating magnetic field acting upon the drag cup 18 so as to provide a restoring torque for the accelerational responsive pendulum 12. The displacement of the pendulum 12 is responsive to the sensed accelerational forces acting upon the pendulum so as to actuate the capacitive pickoff 24–26 to control the electronic means. The controlled electronic means includes the variable oscillators 32 and 34, the demodulators 62 and 66, and the lead and lag networks 72 and 77 for effecting the foregoing action.

Thus, upon a displacement of the pendulum 12 in response to sensed accelerational forces, the adjustment of the single movable plate 12, for example, toward the fixed plate 30 and away from the fixed plate 28 will result in an increase in the capacitance of one condenser, for example, the capacitor 26.

Since the condenser 26 is connected into the tank circuit of the oscillator 32 while the condenser 24 is connected into the tank circuit of the oscillator 34, the increase in the capacitance of the one condenser, for example, the capacitor 26 will cause the frequency of the alternating current output across the output lines 58 from the oscillator 32 to decrease while the frequency of the alternating current output across the output lines 58A from the oscillator 34 will increase.

The output 58 from the oscillator 32 is connected directly to the input terminals 60 of the phase sensitive demodulator 62 and directly to the input terminals 64 of the phase sensitive demodulator 66 while the output 58A from the other oscillator 34 is connected to the input 70 of the 45 degree lead network 72 and to the input 73 of the 45 degree lag network 77.

The outputs 75 and 76 of the lead and lag networks 72 and 77 apply carrier-frequency reference signals to the phase sensitive demodulator 62 and the phase sensitive demodulator 66, respectively, to control the signal applied across the output 78 of the demodulator 62 and the output 79 of the demodulator 66.

The phase-sensitive demodulators 62 and 66 are in effect switching circuits which apply across the respective output lines 78 and 79 thereof a signal voltage proportional to the input voltage and having a polarity which depends on whether the modulated signal and the reference signal have the same or opposed phases.

Thus, in the example given, the frequency of the alternating current applied across the output lines 58 of the oscillator 32 to the phase sensitive demodulators 62 and 66 will be decreased while the frequency of the alternating current applied across the output lines 58A of the oscillator 34 to the lead and lag networks 72 and 77 will be increased.

The frequency of the output signals from demodulator 62 and demodulator 66 is equal to the difference between the respective input and reference frequencies. When the input frequency supplied by oscillator 34 to both demodulators 62 and 66 exceeds the reference frequency originating in oscillator 32 and supplied through lead network 72 and lag network 77 to the lines 75 and 76, the output in lines 78 leads the output in lines 79. This phase relationship causes the drag cup to be torqued in a clockwise sense to restore the pendulum to its neutral position. Conversely, when the input frequency supplied by oscillator 34 is lower than the reference originating in oscillator 32, the drag cup is torqued in a counterclockwise sense to cause the return of the pendulum 12 to the neutral position.

Furthermore, the signals applied through the phase sensitive demodulator 62 and the phase sensitive demodulator 66 to the respective control windings 20 and 22 will be sensed by the control lines 225 and 240 by the counter mechanism 224 so as to effect the desired control operation, heretofore described.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. An accelerometer comprising in combination a pivotally mounted pendulum responsive to accelerational forces, said pendulum including a capacitive pick-off means operable from a null position for effecting electrical control signals upon displacement of the pendulum in response to said accelerational forces, variable oscillator means having a pair of variable frequency alternating current outputs, means operatively connecting the electrical control signals from the capacitive pick-off means to the variable oscillator means for controlling the frequency of the alternating current provided at the pair of outputs thereof, said capacitive pick-off means being so arranged that the frequency of the alternating current from one of said pair of outputs may be increased and the frequency of the alternating current from the other of said pair of outputs may be decreased upon a displacement of the pendulum in response to said accelerational forces effecting operation of the capacitive pick-off means from said null position, first and second phase sensitive demodulator means operative by the alternating current supplied from one of said pair of outputs of the variable oscillator means, and phase shifting means operative by the alternating current from the other of said pair of outputs of the variable oscillator means, said phase shifting means being operatively connected in controlling relation to said first and second demodulator means, said phase shifting means feeding to said first phase sensitive demodulator means a controlling alternating current having a phase in leading relationship relative to the phase of the alternating current from said other of said pair of outputs of the variable oscillator means, and said phase shifting means feeding to said second phase sensitive demodulator means a controlling alternating current having a phase in lagging relationship relative to the phase of the alternating current from said other of said pairs of outputs of the variable oscillator means, said first and second demodulator means providing variable frequency alternating current output control signals of shifting phase relationship one to the other dependent upon the sense and magnitude of the accelerational forces acting on said pendulum and controlling said capacitive pick-off means, and a two phase torquing motor operative by said control signals of shifting phase relationship so as to apply a restoring torque to the pendulum for returning the capacitive pick-off means to the null signal position.

2. The combination defined by claim 1 including means for counting the frequency of the alternating current output control signals from said first demodulator means, and means dependent upon the phase relationship of the alternating current output control signals from said first and second demodulator means for selectively applying the frequency count in increasing and decreasing count senses so as to indicate the prevailing velocity in response to the accelerational forces acting upon the pendulum.

3. An integrating accelerometer comprising an acceleration responsive pendulum, a capacitive pick-off to sense displacement of said pendulum in response to accelerational forces, said capacitive pick-off including a first condenser plate carried by said pendulum, second and third condenser plates positioned at opposite sides of said first plate and cooperating therewith to provide a pair of variable condensers, said first plate being movable by said pendulum in relation to said second and third plates so as to increase the capacitance of one condenser and decrease the capacitance of the other condenser depending upon the sense of the accelerational forces acting on the pendulum, a pair of variable frequency oscillators, one of said oscillators being controlled by one of said condensers and the other of said oscillators being controlled by the other of said condensers, said condensers being so arranged in relation to said oscillators that the frequency of the alternating current output of one of said variable oscillators may be increased while the frequency of the alternating current output of the other of said variable oscillators may be decreased upon movement of said first plate relative to said second and third plates, a pair of phase sensitive demodulators, means operatively connecting the alternating current output of one of said variable oscillators to an input of each of said pair of phase sensitive demodulators, a pair of phase shifting networks, means operatively connecting the alternating current output of the other of said variable oscillators to inputs of said pair of phase shifting networks, one of said phase shifting networks providing an alternating current output having a phase in leading relationship relative to the phase of the alternating current input thereto, the other of said pair of phase shifting networks providing an alternating current output having a phase in lagging relationship relative to the phase of the alternating current input thereto, each of said demodulators providing a variable phase alternating current output signal, means for operatively connecting the alternating current output of one of said phase shifting networks to one of the phase sensitive demodulators for controlling the phase of the alternating current output signal from said one demodulator, means for operatively connecting the alternating current output of the other of said phase shifting networks to the other of the phase sensitive demodulators for controlling the phase of the alternating current output signal from said other demodulator, a two-phase torquer motor, means operatively connecting the variable phase alternating current output signals from said pair of phase sensitive demodulators to said motor so as to control the operation thereof, said motor including a drag cup rotor and means for operatively connecting the drag cup rotor to the acceleration responsive pendulum so as to provide a torque acting in a sense to restore the pendulum and thereby return the first condenser plate to a neutral position relative to the second and third condenser plates following the displacement of the pendulum in response to the accelerational forces.

4. The combination defined by claim 3 including means to count the frequency of the alternating current output signal applied by one of said phase sensitive demodulators to said torquer motor, said counter including means responsive to the alternating current output signal applied by the other of said demodulators to said motor, said last-mentioned means being arranged to cause said counter to increase the count upon the alternating current output signals applied to the motor being in one relation and to cause the counter to decrease the count upon the alternating current output signals applied to the motor being in another relation.

5. The combination comprising condition responsive means, capacitive pickoff means displaceable from a null signal position by said condition responsive means for effecting electrical control signals, variable oscillator means having a pair of variable frequency alternating current outputs, means operatively connecting the electrical control signals from the capacitive pickoff means to the variable oscillator means for controlling the frequency of the alternating current provided at the pair of outputs thereof, said capacitive pick-off means being so arranged that the frequency of the alternating current from one of said pair of outputs may be increased and the frequency of the alternating current from the other of said pair of outputs may be decreased upon a displacement of said capacitive pick-off means from a null signal position by said condition responsive means, first and second phase sensitive demodulator means operative by the alternating current supplied from one of said pair of outputs of the variable oscillator means, and phase shifting means operative by the alternating current from the other of said pair of outputs of the variable oscillator means, said phase shifting means being operatively connected in controlling relation to said first and second demodulator means, said phase shifting means feeding to said first phase sensitive demodulator means a controlling alternating current having a phase in leading relationship relative to the phase of the alternating current from said other of said pair of outputs of the variable oscillator means, and said phase shifting means feeding to said second phase sensitive demodulator means a controlling alternating current having a phase in lagging relationship relative to the phase of the alternating current from said other of said pair of outputs of the variable oscillator means, said first and second demodulator means providing variable frequency alternating current output control signals of shifting phase relationship dependent upon the sense and magnitude of the condition acting on said condition responsive means and controlling said capacitive pickoff means, and a two-phase motor operative by said control signals of shifting phase relationship for effecting a rotating magnetic field varying in sense and magnitude with the sensed condition.

6. The combination comprising a condition responsive means, a capacitive pickoff displaceable by said first-mentioned means in response to a sensed condition, said capacitive pickoff including a first condenser plate adjustable by said condition responsive means, second and third condenser plates arranged at opposite sides of said first plate and cooperating therewith to provide a pair of variable condensers, said first plate being movable by said condition responsive means in relation to said second and third plates so as to increase the capacitance of one condenser and decrease the capacitance of said other condenser depending upon the condition sensed by said condition responsive means, a pair of variable frequency oscillators, one of said oscillators being controlled by one of said condensers and the other of said oscillators being controlled by the other of said condensers, said condensers being so arranged in relation to said oscillators that the frequency of the alternating current output of one said variable oscillators may be increased while the frequency of the alternating current output of the other of said oscillators may be decreased upon movement of said first plate relative to said second and third plates, a pair of phase sensitive demodulators, means operatively connecting the alternating current output of one of said variable oscillators to an input of each of said pair of phase sensitive demodulators, a pair of phase shifting networks, means operatively connecting the alternating current output of the other of said variable oscillators to inputs of said pair of phase shifting networks, one of said phase shifting networks providing an alternating current output having a phase in leading relationship relative to the phase of the alternating current input thereto, the other of said pair of phase shifting networks providing an alternating current output having a phase in lagging relationship relative to the phase of the alternating current input thereto, each of said demodulators providing a variable phase alternating current output signal, means for operatively connecting the alternating current output of one of said phase shifting networks to one of the phase sensitive demodulators for controlling the phase of the alternating current output signal from said demodulator, means for operatively connecting the alternating current output of the other of the phase shifting networks to the other of the phase sensitive demodulators for controlling the phase of the alternating current output signal from said other demodulators, a two-phase motor, and means operatively connecting the variable phase alternating current output signals from said pair of phase sensitive demodulators to said motor so as to control the operation thereof in accordance with the sense and magnitude of the sensed condition.

References Cited by the Examiner
UNITED STATES PATENTS

| | | | |
|---|---|---|---|
| 2,809,524 | 10/1957 | Masterson | 73—382 |
| 2,882,034 | 4/1959 | Wuerth | 73—503 |
| 2,899,190 | 8/1959 | Driver | 73—517 |
| 2,939,072 | 5/1960 | Bell | 73—517 |
| 2,943,493 | 7/1960 | Bosch et al. | 73—503 |
| 2,964,949 | 12/1960 | Wilcox | 73—503 |
| 2,972,660 | 2/1961 | Toulon | 331—12 |
| 3,071,974 | 1/1963 | Peterson | 73—517 X |
| 3,077,782 | 2/1963 | Slater | 73—503 |
| 3,114,267 | 12/1963 | Mundo | 73—516 |
| 3,140,450 | 7/1964 | Tavis | 73—398 X |

RICHARD C. QUEISSER, *Primary Examiner.*

JAMES J. GILL, *Examiner.*